(12) United States Patent
Pham et al.

(10) Patent No.: US 6,939,031 B2
(45) Date of Patent: Sep. 6, 2005

(54) APPARATUS FOR MOUNTING A FRAC BLENDER ON A TRANSPORT VEHICLE

(75) Inventors: Hau Pham, Houston, TX (US);
Guillermo Guerrero, Sugar Land, TX (US); Edward Leugemors, Sugar Land, TX (US); Jean-Louis Pessin, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 10 days.

(21) Appl. No.: 10/611,479

(22) Filed: Jul. 1, 2003

(65) Prior Publication Data

US 2005/0000685 A1 Jan. 6, 2005

(51) Int. Cl.$^7$ ................................. F16M 11/24
(52) U.S. Cl. ........................... 366/53; 248/669
(58) Field of Search ............ 166/90.1, 75.11, 166/75.14; 175/161; 280/830; 366/68, 53; 410/2, 68, 52; 248/644, 646, 637, 669, 678, 676

(56) References Cited

U.S. PATENT DOCUMENTS

| | | | | |
|---|---|---|---|---|
| 1,918,161 A | * | 7/1933 | Whitwam | 166/79.1 |
| 5,006,034 A | * | 4/1991 | Bragg et al. | 414/555 |
| 6,722,875 B2 | * | 4/2004 | Ralph et al. | 425/576 |

* cited by examiner

*Primary Examiner*—David Bagnell
*Assistant Examiner*—K. Thompson
(74) *Attorney, Agent, or Firm*—Stephen Schlather; Tim Curington; Robin Nava (57) ABSTRACT

A support system for supporting a frac blender or other heavy load on a transport vehicle includes a support frame having vertically extending slides for a lift platform whereby the load may be moved between a stowed position and an operating position along a vertical, linear path within the limits of the support frame. The drive system and the lift platform are slip connected to the frame for minimizing bending stress as the load is moved between positions

11 Claims, 11 Drawing Sheets

APPARATUS FOR MOUNTING A FRAC BLENDER ON A TRANSPORT VEHICLE

BACKGROUND OF THE INVENTION

1. Field of the Invention

The subject invention is related to a method and apparatus for mounting a heavy load on a transport vehicle in such a manner that the load may be moved between a stowed position and an operating position along a vertical path and is particularly directed to a method and apparatus for mounting a frac blender.

2. Discussion of the Prior Art

Fracturing was first employed to improve production from marginal wells in the late 1940's. Following an explosion of the practice in the mid-1950's and a considerable surge in the mid-1980's, massive hydraulic fracturing grew to become a dominant production/stimulation technique, primarily for low permeability reservoirs in North America. By the mid-1990's, forty percent of new oil wells and seventy percent of gas wells in the United States were fracture treated. With improved fracturing capabilities, and the advent of high permeability fracturing, the practice has expanded further to become the completion of choice for all types of wells in the United States, but particularly natural gas wells. The tremendous advantage in fracturing most wells is now largely accepted. It is estimated that hydraulic fracturing may add several hundred thousand barrels per day from existing wells throughout the world.

Hydraulic fracturing entails injecting fluids in an underground formation at a pressure that is high enough to induce parting of the formation. Granulated materials, called proppants, which range from sand to synthetic materials are pumped into the created fracture to create a slurry. These proppants hold open the created fracture after the injection pressure is relieved. The fracture, filled with proppant, creates a narrow but conductive flow path toward the well bore.

In order to facilitate fracturing of existing wells, workover equipment includes a transportable fracture blender, or frac blender, for creating the slurry at the well site. Typically these transportable frac blenders are mounted on trailers or truck beds or a similar transport vehicle. A typical frac blender weighs several tons. It has to be moved into position and placed at or near ground level during operation.

Prior art transportable frac blenders are mounted on the rear of the transport vehicle and moved from a raised or stowed position permitting movement of the vehicle to a lowered operating position at the job site. Typically, the frac blender is mounted on a hinged lift mechanism and moves through an arc about a "hinge" to rotate the blender from the upper stowed position to the lower operating position. This is an awkward mounting system at best and places tremendous stress on the hinge system as well as the drive system for moving the blender between positions.

In addition, such massive units are difficult to keep in balance during movement between positions even under the best of circumstances, creating a hazardous rollover potential. In the field, where uneven terrain is often present as well as numerous environmental conditions, it is difficult to maintain balance and the resulting binding stresses can generate wear and tear and frequent breakdowns.

While such systems have gained widespread acceptance, it remains desirable to provide a more dependable apparatus and method for mounting and transporting frac blenders.

SUMMARY OF THE INVENTION

The subject invention is directed to a novel transportable frac blender mounting system and method. The mounting system for supporting a frac blender or other heavy load on a transport vehicle includes a support frame having vertically extending slides for a lift platform whereby the load may be moved between a stowed position and an operating position along a vertical, linear path within the limits of the support frame. The drive system and the lift platform are slip connected to the frame for minimizing binding stress as the load is moved between positions, and to facilitate manufacture and assembly.

In the preferred embodiment of the invention a support frame is mounted on the transport vehicle with two slide rails mounted within the support frame. Each slide is moveable in a substantially vertical path along its respective slide rail. A moveable platform is mounted between the slides and moveable therewith within the support frame for substantially vertical linear movement within the frame between a stowed position and an operating position. A drive system is operable for moving the frac blender and platform between the stowed position and the operating position.

Typically, the support frame has both a horizontal span and a vertical span and the platform substantially spans the horizontal span. A pair of slide rails are positioned to span the vertical span of the support frame in spaced parallel relationship at opposite sides of the horizontal span. A pair of slides are mounted, one each on each slide rail, and the platform spans the pair of slides and is secured to each of said slides. A transfer bar spans the space between the spaced slide rails and engages the slides wherein the drive system is connected directly to the transfer bar, the transfer bar being slip mounted to the slide rails for permitting relative movement between the slide rails and the transfer bar. The drive system is also slip mounted for relative movement between the drive system and the support frame for minimizing any binding forces between the drive system and the transfer bar.

In the preferred embodiment, the support frame has an upper, elongated mounting bracket and the slide rails are mounted on and depend from the upper bracket. One or more jack screw blocks are mounted on the transfer bar. The drive system comprises a vertical screw having one end mounted on the upper bracket and extending axially through the jack screw block. As the jack screw is driven to rotate about the screw, the transfer block moves axially along the screw, moving the slides along the rail. The frac blender is mounted on slides and moves therewith. The transfer bar is slip coupled to the slides to minimize any bending stress on the screw drive system. In the preferred embodiment the lower ends of the screw and the slide rails are also secured in fixed relationship with the support frame and chassis of the transport vehicle.

The system of the subject invention provides a method for supporting a frac blender on a transport vehicle in a manner permitting the frac blender to be moved between an upper stowed position and a lower operating position along a linear, vertical path by securing a support frame having a vertical reach to a transport vehicle, the support member having a vertically extending slide rail, and mounting a lift member on the slide rail for movement along the vertical reach of the support frame. The frac blender is mounted on the lift member and drive means are provided for driving the lift member between the upper and lower positions along the slide. It is an important feature of the method that the connection between the drive system and the lift member is a slip connection to reduce binding stresses.

The accompanying drawings and detailed description of the preferred embodiment of the invention follow.

DETAILED DESCRIPTION

Figure 1:
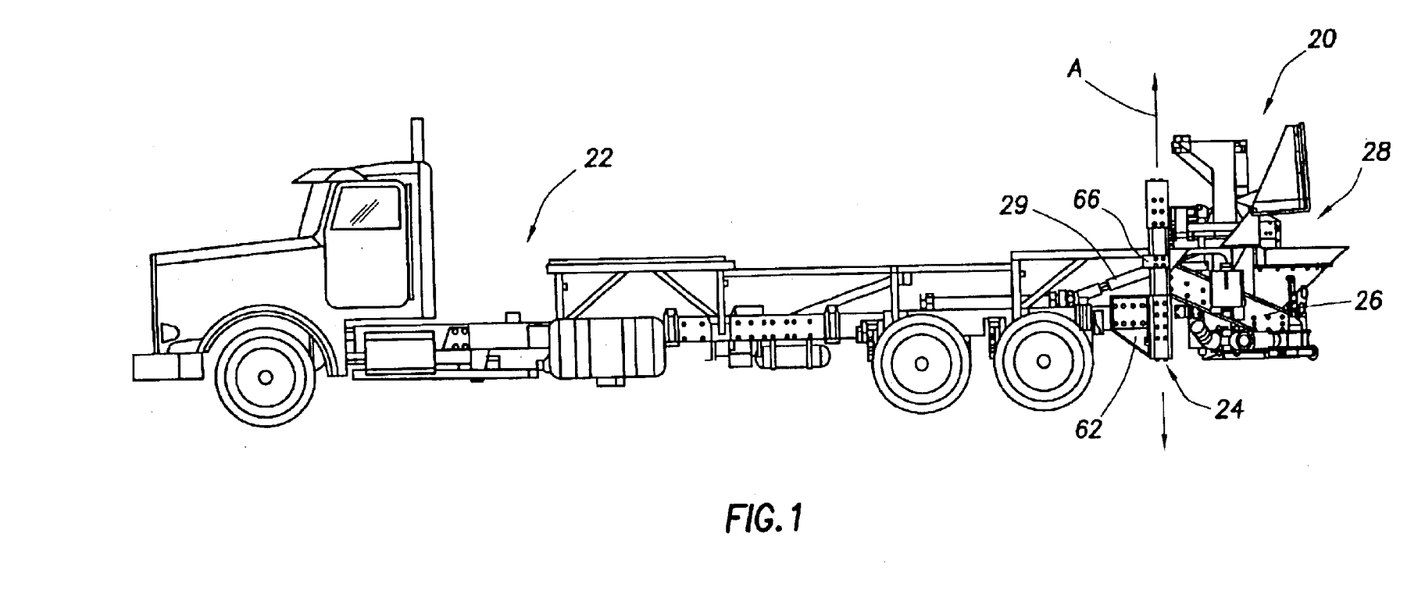
FIG. 1 is an illustration of the fracture (frac) blender/mixer of the subject invention mounted on the chassis of a transport truck.

The fracture blender or mixer system 20 (or more commonly the frac blender) of the preferred embodiment is shown as mounted on a transport truck 22 in FIG. 1. The main components of the system are a lift frame 24, a support cage or base 26 and the frac blender 28. The drive train 29 is powered via hydraulic motors mounted on the truck chassis. The entire frac blender system of the subject invention is supported on the cage 26, which is in turn, mounted on the lift frame 24. The lift frame 24 is mounted on the truck chassis. The frac blender and cage are moveable along a vertical, straight linear path as indicated by line A for moving the blender between the raised transport position as shown in FIG. 1 and a lowered operating position.

Figure 2:
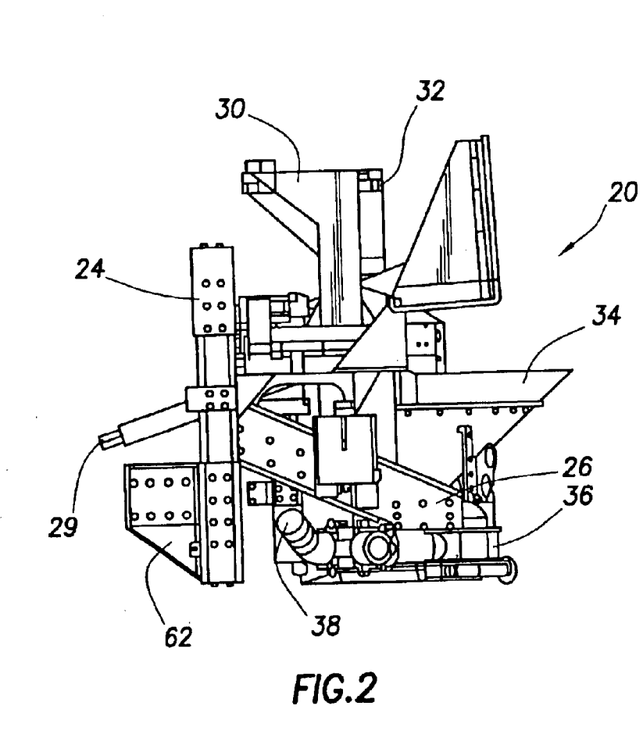
FIG. 2 is an enlarged side view of the frac blender shown in the same orientation as FIG. 1.
Figure 3:
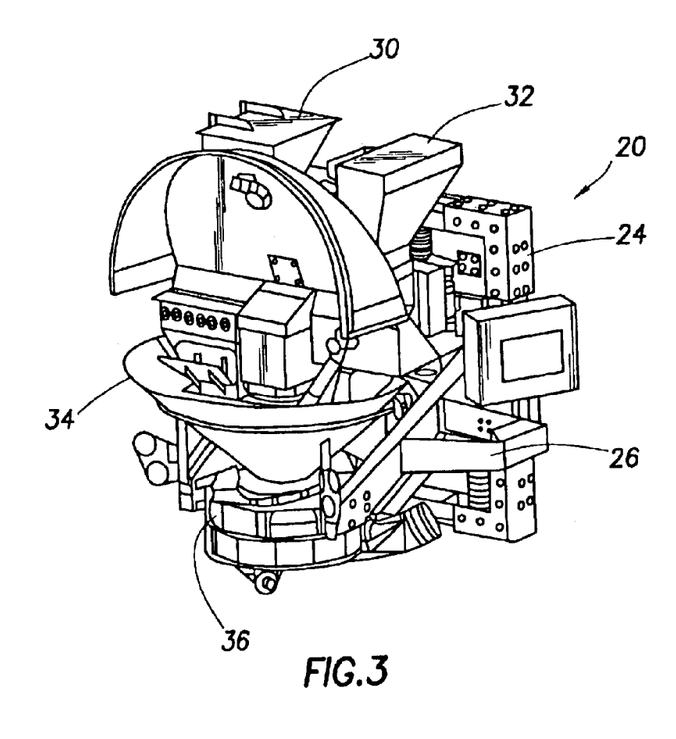
FIG. 3 is a perspective view of the frac blender.

FIGS. 2 and 3 illustrate the frac blender system 20 in greater detail. The blender 28 is of relatively typical design and includes a pair of receptacles 30, 32, for introducing dry materials to the mix. The additive and proppant are introduced into the hopper 34 where they form a slurry which is dropped into the mixing tub 36. Upon completion of the mixing cycle the mixed slurry is exited through outlet 38.

The entire frac blender assembly is mounted on the cage or platform 26. The cage is more clearly illustrated in FIG. 10 and includes a base or stage 40 having two sections 42 and 44 for supporting the blender 28. The angle braces 46 and 48, as well as the cross brace 50 provide rigidity to the structure and are positioned to cradle and solidly support the blender. The mounting plates 52 and 54 are provided for mounting the cage to the lift frame 24.

Figure 4:
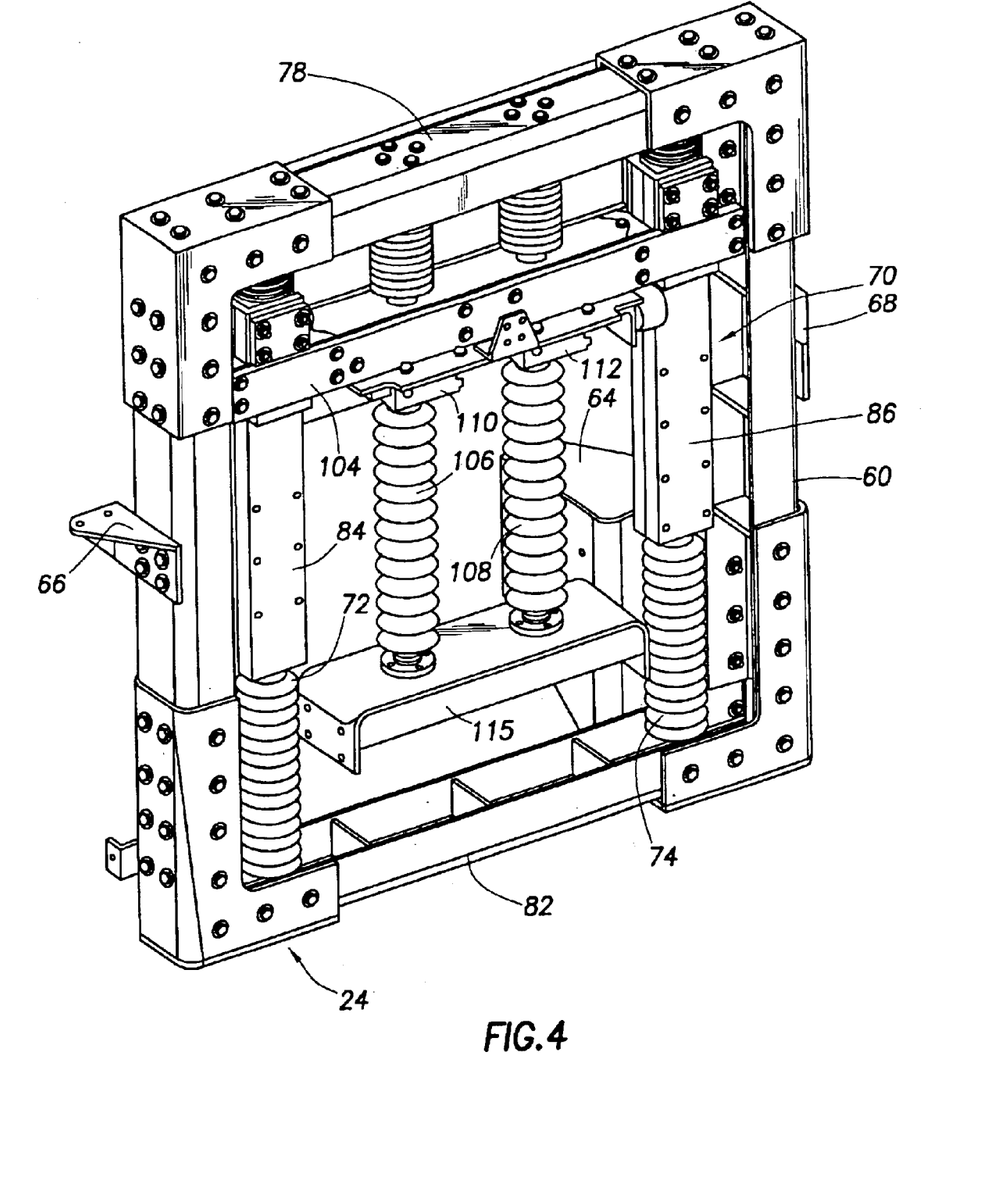
FIG. 4 is a front perspective view of the lift frame.
Figure 5:
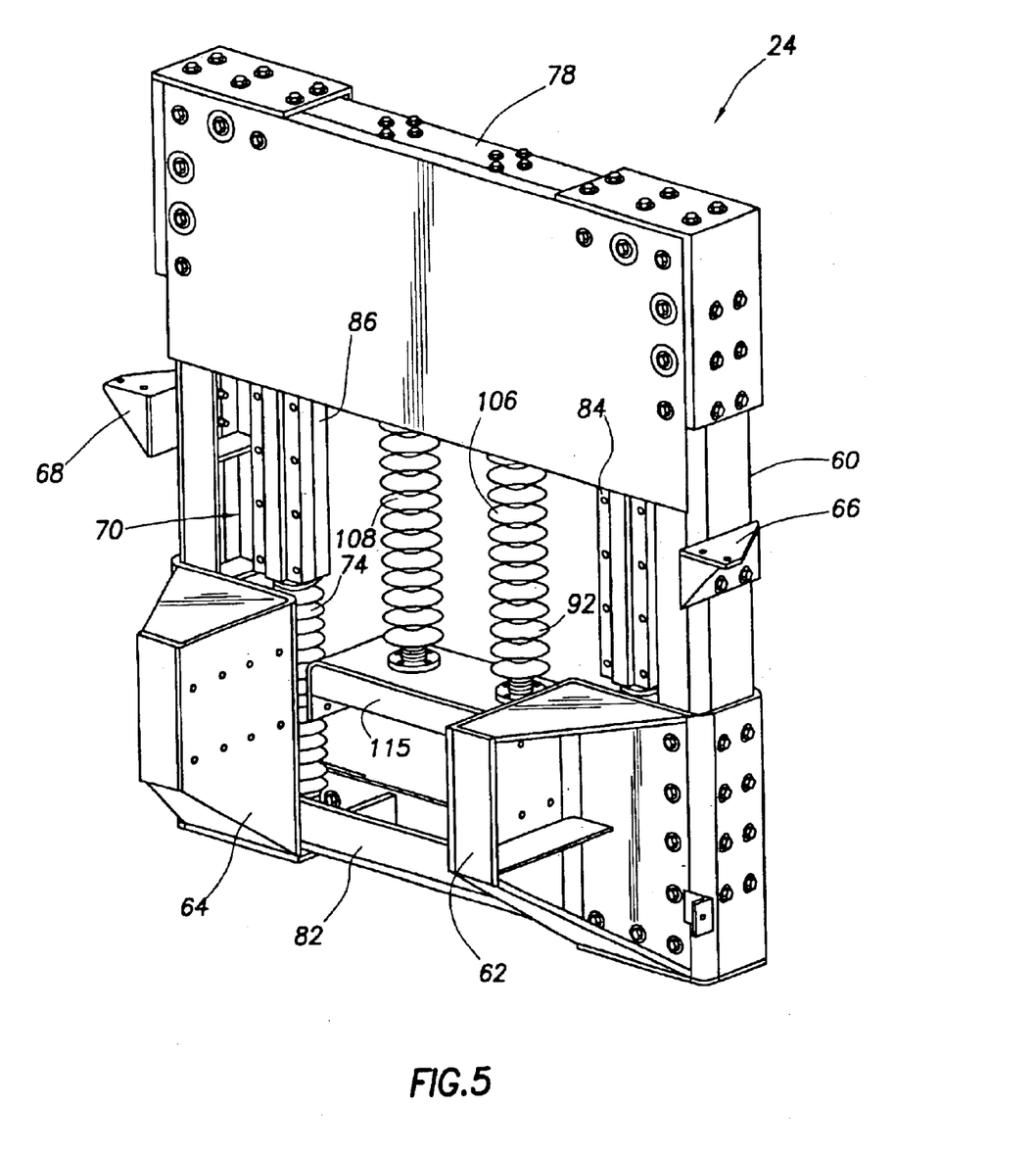
FIG. 5 is a rear perspective view of the lift frame.
Figure 6:
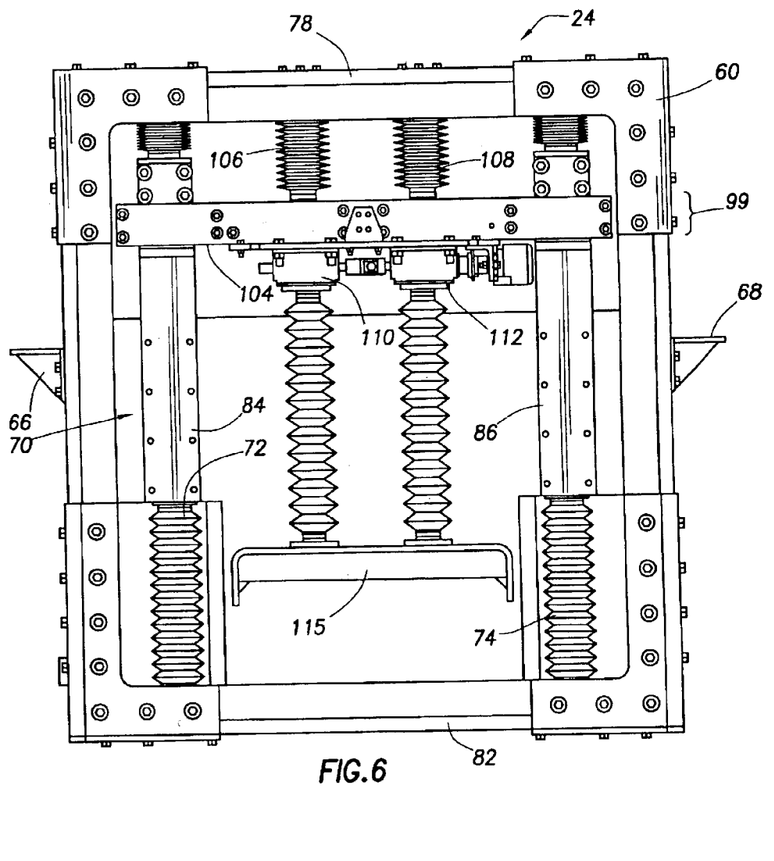
FIG. 6 is a front view of the lift frame.
Figure 7:
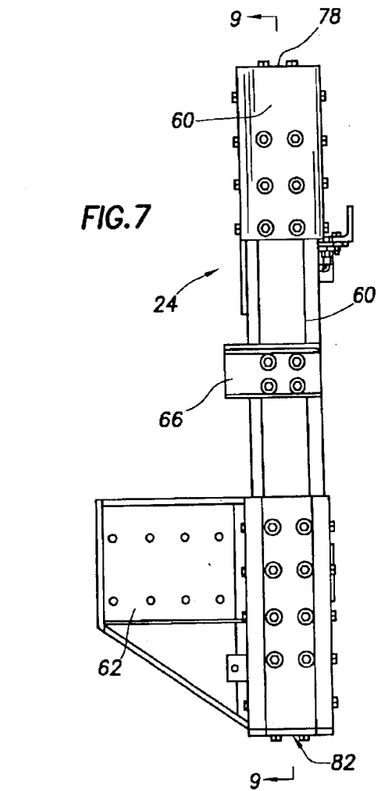
FIG. 7 is a side view of the lift frame.

The heart of the invention is the lift frame assembly. FIGS. 4 and 5 are perspective front and back views, respectively, showing the main components of the lift frame 24. FIG. 6 is a front view of the lift frame. FIG. 7 is a side view of the lift frame. The lift frame includes an outer rigid framework or outer frame 60 having the mounting brackets 62, 64 for mounting the entire assembly to the transport truck, as shown in FIG. 1. Supplementary mounting brackets 66 and 68 may also be provided, and utilized as shown in FIG. 1. The outer frame 60 supports the lift assembly 70 which is mounted within the outer frame.

Figure 8:
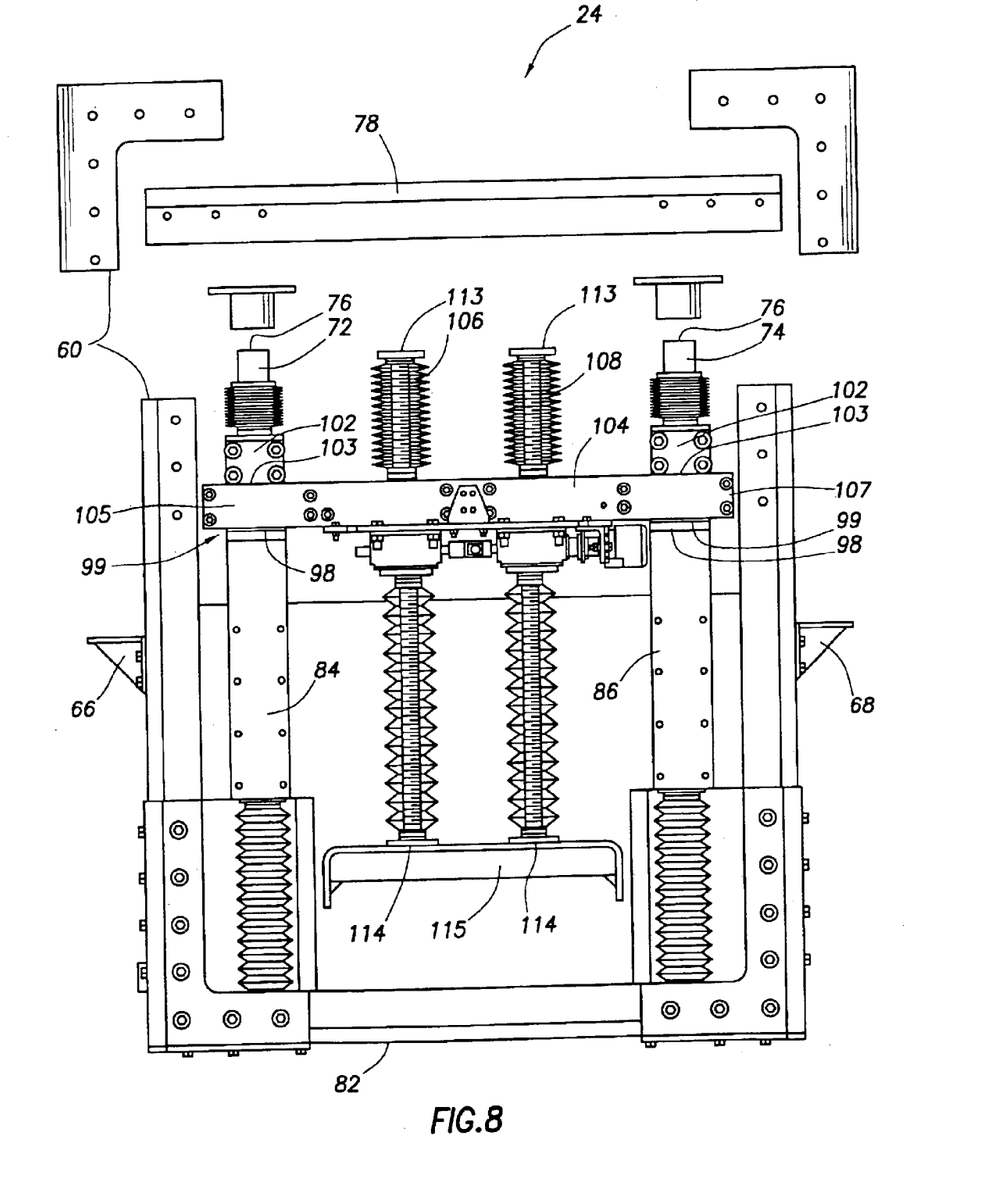
FIG. 8 is an exploded view of the lift frame looking in the same direction as FIG. 6.
Figure 9:
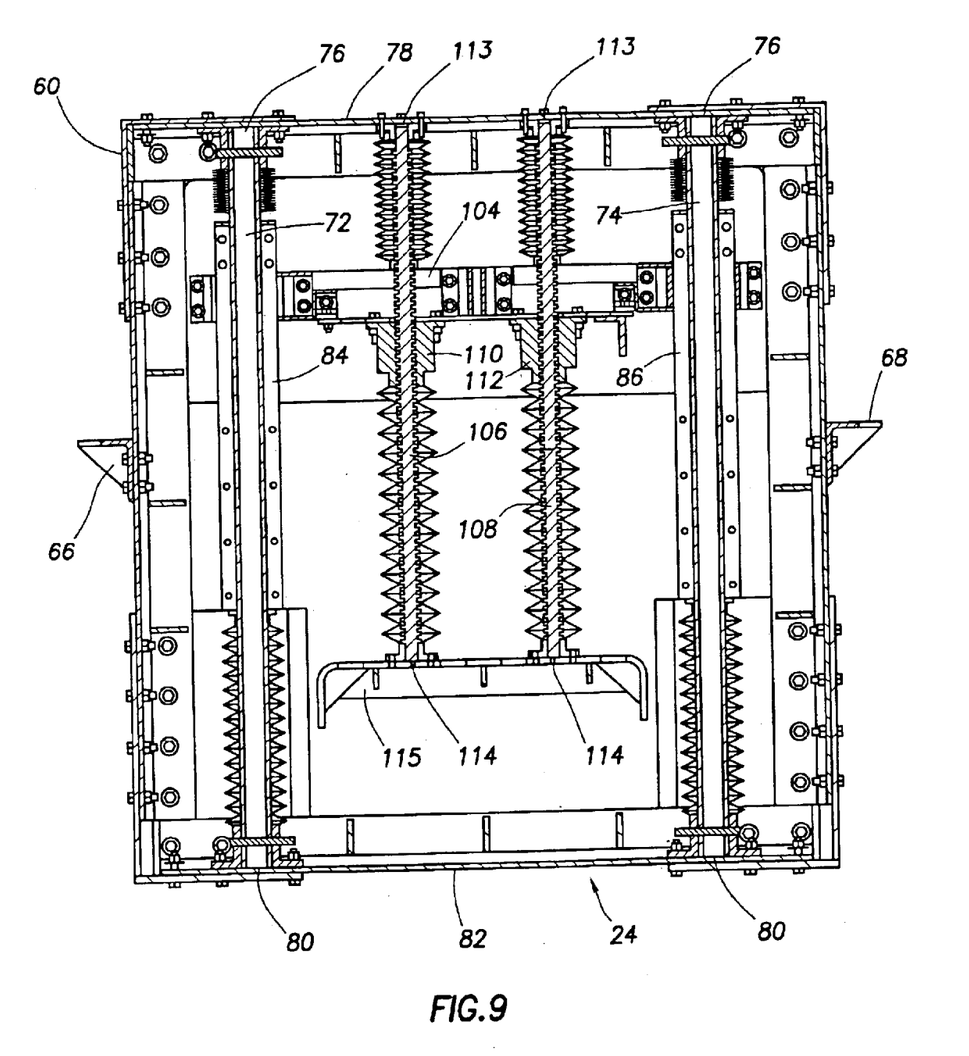
FIG. 9 is a section view taken along line 9—9 of FIG. 7.

The lift assembly 70 is best illustrated in the exploded view FIG. 8 and the sectional view FIG. 9, which is taken along line 9—9 of FIG. 7. With specific reference to FIG. 9, the lift assembly comprises a pair of rigid rails 72, 74. Each rail extends the span of the outer frame 60 and has an upper end 76 anchored in the top bracket or plate 78 of the frame 60 and a lower end 80 anchored in the bottom bracket or plate 82 of the frame 60. A pair of slides/bushings 84 and 86 are mounted, one on each rail 72, 74, respectively.

Figure 13:
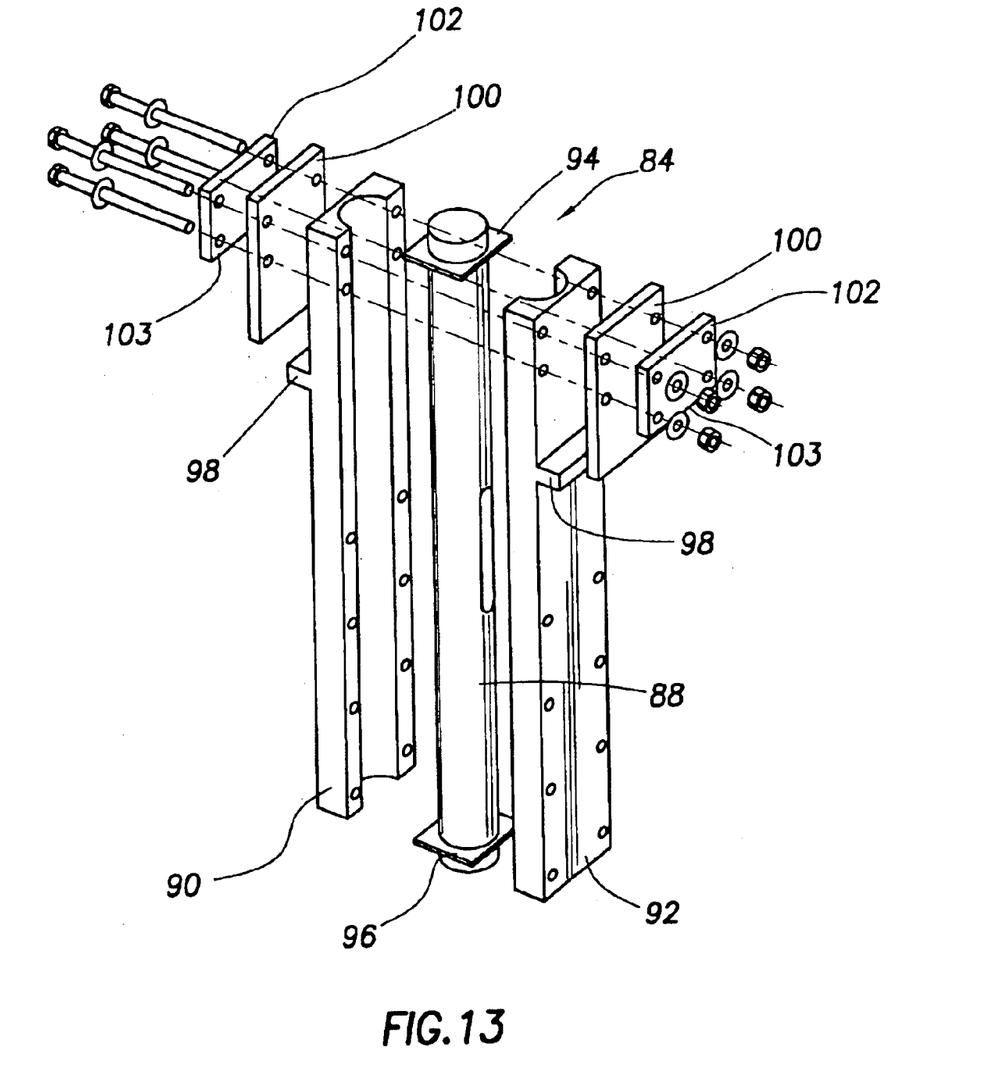
FIG. 13 is a perspective exploded view of the bushing housing assembly.

The bushing assembly is best shown in FIG. 13. The bushing 84 is shown and includes an inner slide bushing member 88 adapted to slide on the rail 74. A pair of opposed brackets 90 and 92 encompass the slide bushing member 88 and are sandwiched between upper plate 94 and lower plate 96. The upper end of each bracket includes a rail or ridge 98 which extends outwardly beyond the outermost face of the mounting plates 100 and 102 when fully assembled. Each fully assembled slide bushing 84, 86 is slideably mounted on the respective rail 72, 74, as shown in FIGS. 8 and 9.

Figure 11:
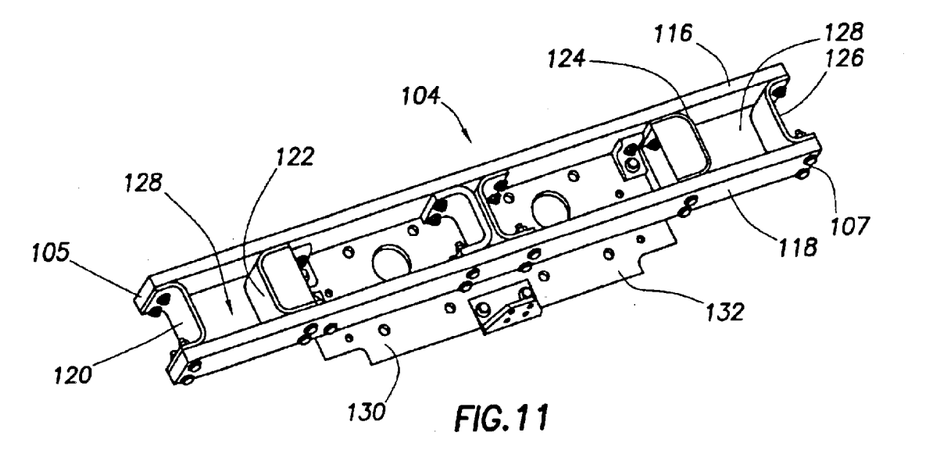
FIG. 11 is a perspective view of the transfer bar.
Figure 12:
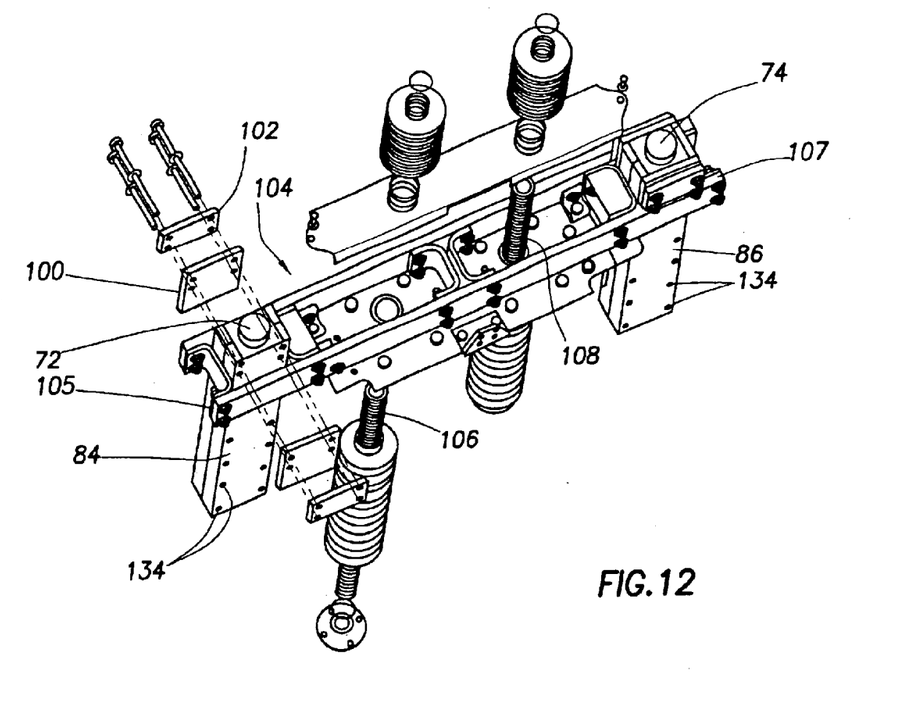
FIG. 12 is an exploded perspective view of the screw jack mechanism, transfer bar and bushing/rail assembly.

A transfer bar 104 spans the two rails 84 and 86 as best shown in FIGS. 8, 11 and 12. The transfer bar spans the slide rails 72 and 74 and has outer ends 105 and 107 received in the channel 99 defined by the ridge 98 and the lower edge 103 of mounting plate 102 and the ridge 98 of each slide/bushing 84 and 86, respectively.

Figure 14:
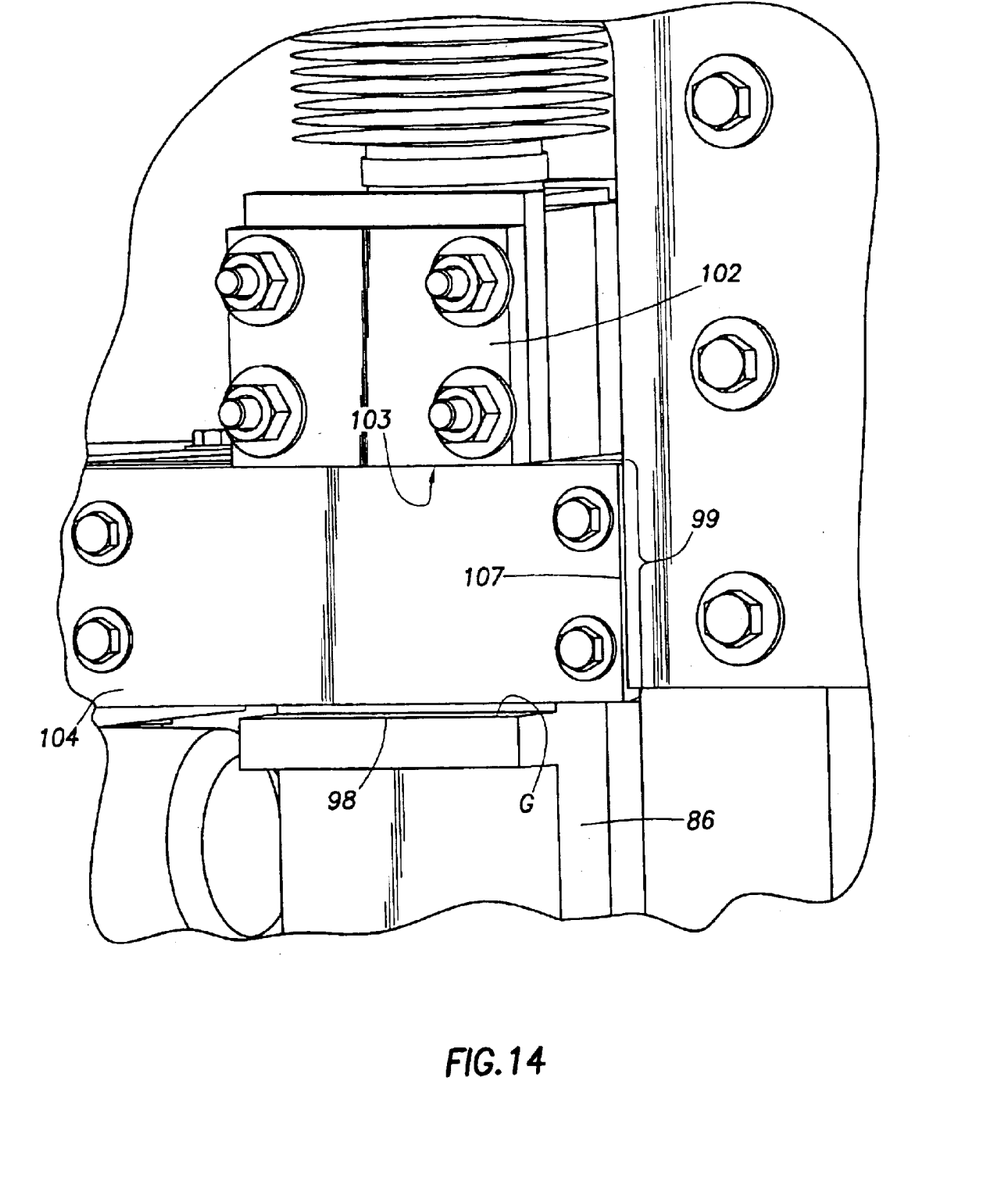
FIG. 14 is an enlarged, perspective, partial view of the slip assembly.

As best shown in FIG. 14, when the assembly is in the raised, stowed position shown, the transfer bar 104 engages and lifts the slide/bushings 84, 86 by engaging the edge 103 of plate 102. When in the lowered, operating position, the transfer bar engages the ridge 98 to secure the assembly in operating position. As shown in FIG. 14, there is a gap G between the outer ends 105 and 107 of the transfer bar and the plate edge 103 and the ridge 98 to provide a slip assembly. This permits the transfer bar to move freely within the gap for a controlled limited distance and minimizes any tendency of the system to bind or place any bending stress on the drive screws 106 and 108 as the transfer bar, bushing/slides and load are moved between the lower operating position and the upper transport position.

The pair of drive screws 106 and 108 each have an upper end 113 secured to the upper plate or bracket 78 of the support frame 60 and a lower end 114 secured to a mounting block 115. In the preferred embodiment the mounting block is secured directly to the transport vehicle chassis. However, it will be understood that any mounting system rigidly securing and fixing the screws in position relative to the chassis, and support frame would be acceptable. The transfer bar includes a pair of complementary jack screw blocks 110 and 112 for receiving the drive screws 106 and 108, respectively. The jack screws are drive in typical manner by a hydraulic motor (not shown) typically mounted on the chassis and rotate for raising and lowering the transfer bar 104 and the load along the vertical, straight path defined by the screws 106 and 108.

The transfer bar 104 is best shown in FIGS. 11 and 12. In the embodiment illustrated the transfer bar includes a pair of side rails 116 and 118 secured by a plurality of spacing brackets 120, 122, 124 and 126. Each pair of brackets 120, 122 and 124, 126, along with side rails 116 and 118 form an opening 128 adapted to receive the respective slide bushing assembly for permitting the transfer bar to rest on the ridges 98. The jackscrew blocks 110 and 112 are mounted on plates 130 and 132, respectively, which are also mounted on the rails 116 and 118.

Figure 10:
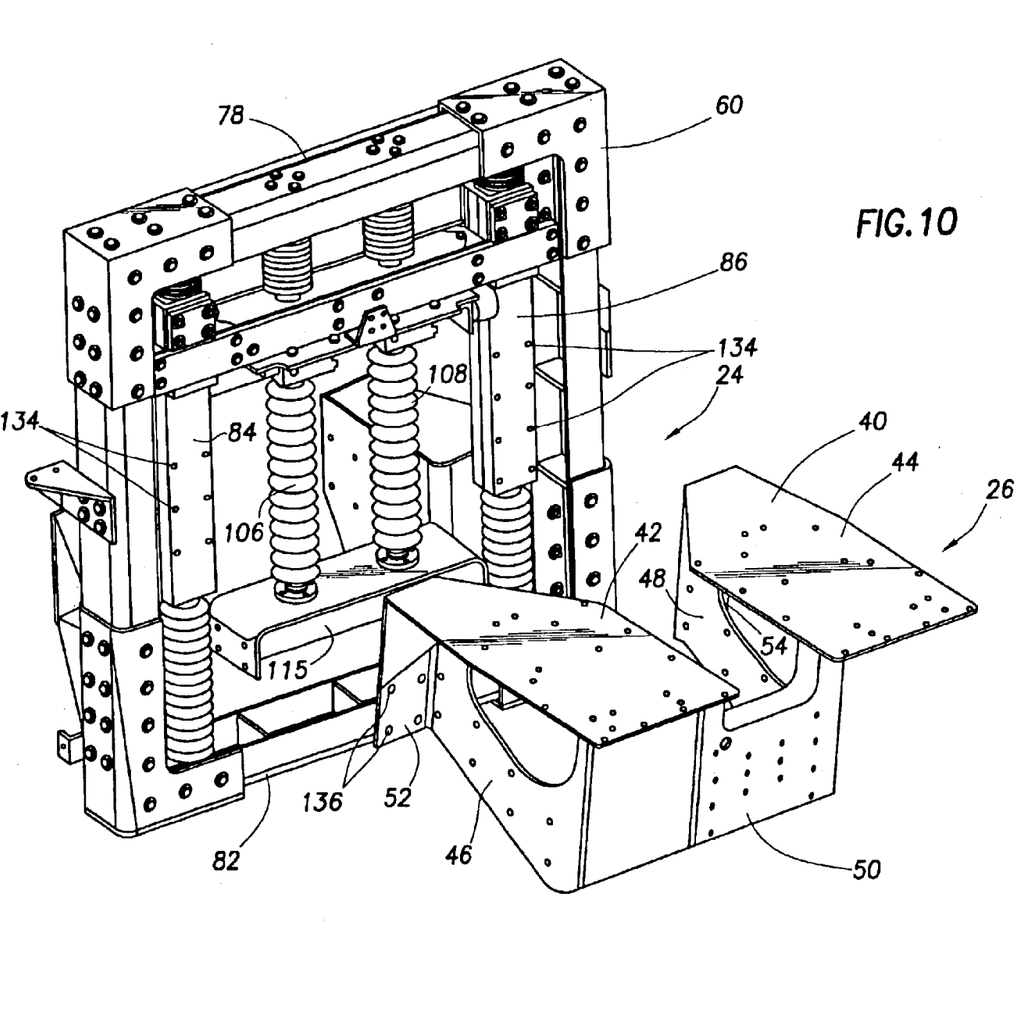
FIG. 10 is an exploded perspective view of the transfer cage and lift frame assembly.

As seen in FIGS. 6, 10 and 12, the slide/bushings 84 and 86 each have a plurality of mounting holes 134 which mate with the mounting holes 136 on the mounting brackets 52 and 56 of the cage 26 for mounting the cage on the lift frame. The frac blender is mounted on the cage in a suitable manner.

This assembly permits the frac blender to be moved between a raised transport position and a lowered operating position in a straight or linear vertical movement. It also provides a drive screw assembly for driving the lift frame between the uppermost transport position and the lowermost operating position without putting any binding strain on the screws since the transfer bar is loosely assembled in the system. Further, the bushing/rail configuration places all of the cantilevered load of the cage and frac blender on the rails, minimizing any radial load on the screws.

The system of the subject invention departs substantially from the methodology of the prior art by permitting linear movement of the frac blender between raised and lowered positions rather than along an arc having a high stress bending moment. In addition, the system of the subject invention provides vertical linear support of the frac blender over a substantial area without limiting its movement between raised and lowered position and transfers the bending load away from the drive mechanism. The system also shifts the weight closer to the chassis of the transport truck, reducing the potential for roll over or tipping.

While the system is shown for supporting a frac blender for transport, it should be understood that the cage could be readily adapted to support other heavy equipment required to be transferred to and from a job site and moved between a stowed, transport position and an operating position. While certain features and embodiments of the invention have been described in detail herein, it should be understood that the invention encompasses all modifications and enhancements within the scope and spirit of the following claims.

What is claimed is:

1. A load bearing assembly for supporting a load on a transport system, the load being moveable between a stowed position and an operating position, the load bearing assembly comprising:
   a. a support frame mounted on the transport system, the support frame having both a horizontal and a vertical span;
   b. one or more slide rails mounted within the frame and positioned to span the vertical span of the support frame;
   c. one or more slides mounted, one on each slide rail, and moveable in a substantially vertical path along the slide rails;
   d. one or more moveable platforms mounted, one on each slide, and moveable therewith within the support frame for substantially vertical linear movement within the frame between a stowed position and an operating position, the one or more moveable platforms for supporting a load;
   e. a drive system for moving the one or more platforms, load and one or more slides between the stowed position and the operating position; and
   f. a transfer device spanning the space between the spaced slide rails and engaging the slides wherein the drive system is connected directly to the transfer device the transfer device being slip mounted to the slide rails, permitting relative movement between the slide rails and the transfer device.

2. The load bearing assembly of claim 1, wherein the drive system is mounted for relative movement between the transfer device and the support frame for minimizing any binding forces within the drive system.

3. The load bearing assembly of claim 1, wherein:
   a. the support frame has an upper, elongated mounting surface;
   b. the slide rails are mounted on and depend from the upper surface;
   c. a jack screw block is mounted on the transfer device;
   d. the drive system comprises a vertical screw having one end mounted for rotation on and depending from the upper surface and extending axially through the jack screw block.

4. The load bearing assembly of claim 3, wherein:
   a. the support frame includes a lower, elongated mounting surface; and
   b. the slide rails have opposite ends secured to the upper and lower surfaces, respectively.

5. A lift system for supporting a frac blender on a transport vehicle in a manner permitting the frac blender to be moved along a substantially vertical linear path between a raised, transport position and a lowered, operating position the lift system comprising:
   a. a support frame mounted on the transport vehicle, the support frame having both a horizontal span and a vertical span;
   b. one or more slide rails mounted within the support frame, the one or more slide rails positioned to span the vertical span of the support frame;
   c. one or more slides mounted, one on each slide rail, and moveable in a substantially vertical path alone the slide rails;
   d. one or more moveable platforms mounted, one on each slide, and moveable therewith within the support frame for substantially vertical linear movement within the frame between a stowed position and an operating position, the one or more moveable platforms for supporting the frac blender;
   e. a drive system for moving the frac blender and the one or more platforms between the stowed position and the operating position; and
   f. a transfer bar spanning the space between the one or more slide rails and engaging the one or more slides wherein the drive system is connected directly to the transfer bar, the transfer bar being slip mounted to the one or more slide rails for permitting relative movement between the one or more slide rails and the transfer bar.

6. The lift system of claim 5, wherein the drive system is mounted for relative movement between the transfer bar and the support frame for minimizing any binding forces within the drive system.

7. The lift system of claim 6, wherein:
   a. the support frame has an upper, elongated mounting surface;
   b. the slide rails are mounted on and depend from the upper surface;
   c. a jack screw block is mounted on the transfer bar;
   d. the drive system comprises a vertical screw having one end mounted for rotation on and depending from the upper surface and extending axially through the jack screw block.

8. A lift system for supporting a frac blender on a transport vehicle in a manner permitting the frac blender to be moved alone a substantially vertical linear path between a raised, transport position and a lowered, operating position the lift system comprising:
   a. a substantially rectangular support frame mounted on the transport vehicle, the support frame having vertical elongated sides and horizontal elongated top and bottom members;
   b. a pair of slide rails mounted within the support frame in parallel spaced relationship and extending vertically between the top and bottom frame members, the slide rails having opposite end secured to the;
   c. a slide mounted on each slide rail moveable in a substantially vertical path along the slide rail;
   d. a moveable platform spanning the slide rails and mounted on each slide and moveable therewith within the support frame for substantially vertical linear movement within the frame between a stowed position and an operating position;
   e. a drive system for moving the frac blender and platform between the stowed position and the operating position; and
   f. a transfer bar spanning the space between the spaced slide rails and engaging the slides wherein the drive system is connected directly to the transfer bar, the transfer bar being slip mounted to the slide rails for permitting relative movement between the slide rails and the transfer bar.

9. The lift system of claim 8, wherein the drive system is mounted for relative movement between the transfer bar and the support frame for minimizing any binding forces within the drive system.

10. The lift system of claim 9, wherein:
   a. a jack screw block is mounted on the transfer bar;
   d. the drive system comprises a vertical screw having one end mounted for rotation on and depending from the upper member of the support frame and extending axially through the jack screw block.

11. The lift system of claim 10, wherein the opposite end of the vertical screw is free, permitting relative translational movement between the vertical screw and the support frame.

* * * * *